Patented Sept. 21, 1937

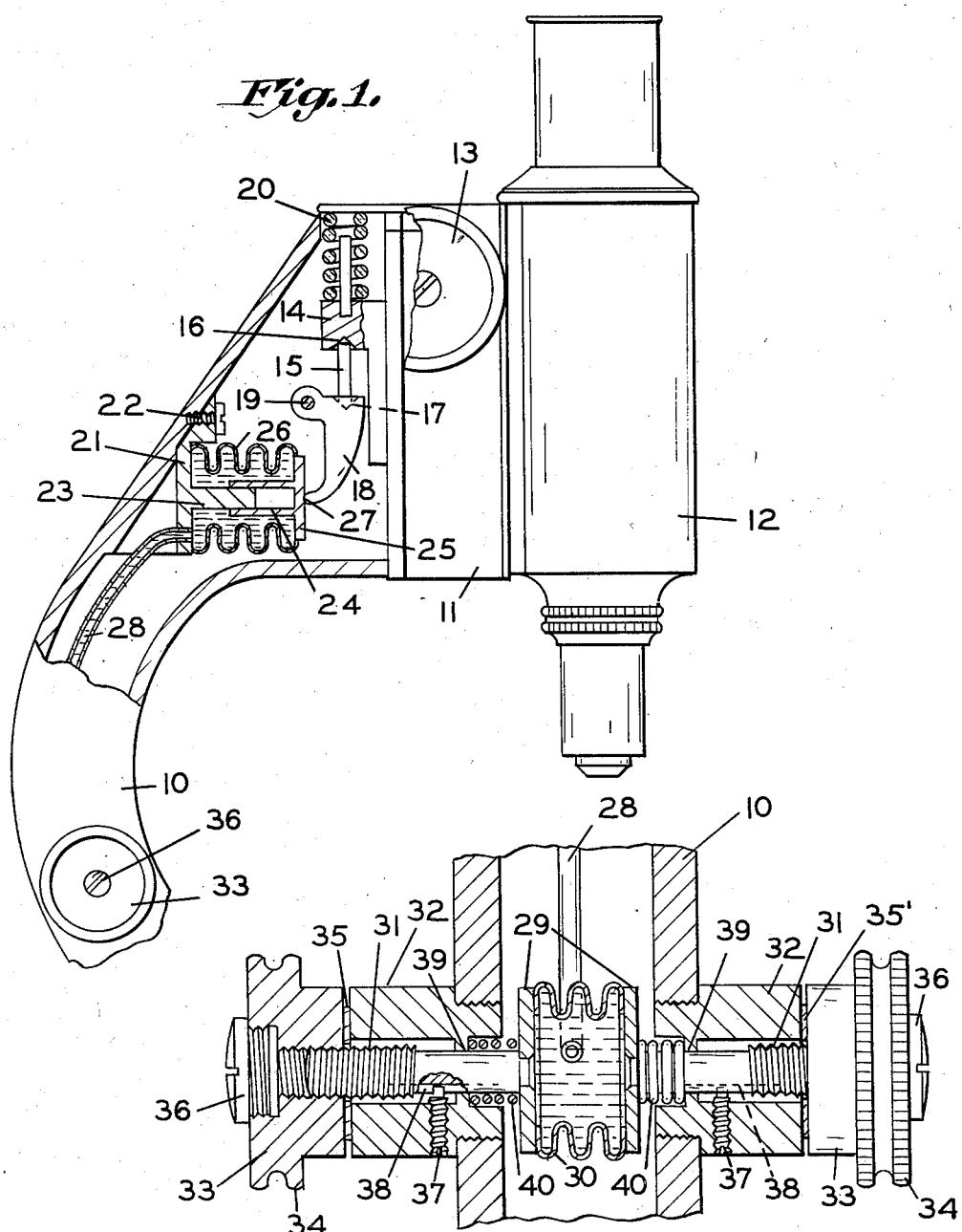

2,093,604

UNITED STATES PATENT OFFICE 2,093,604

MICROSCOPE

George B. Gallasch, Rochester, N. Y., assignor to Bausch & Lomb Optical Company, Rochester, N. Y., a corporation of New York Application August 31, 1934, Serial No. 742,256

15 Claims. (Cl. 88—39)

This invention relates to microscopes and more particularly to means for effecting a fine adjustment for focusing the instrument.

One of the objects of this invention is to provide a fine adjustment for a microscope which is of simple construction and yet efficient in operation. Another object of this invention is to provide a fine adjustment mechanism for a microscope in which the adjusting knob or handle may be placed in any desired location without affecting the location or operation of the other elements. A further object of the invention is to provide a hydraulic fine adjustment mechanism for a microscope. These and other objects and advantages reside in certain novel features of construction, arrangement and combination of parts as will hereinafter be more fully described and pointed out in the appended claims.

Referring to the drawing:

Fig. 1 is a side elevation of a microscope arm and body tube with parts broken away to show part of the adjusting mechanism.

Fig. 2 is an enlarged section with parts in elevation showing the remainder of the mechanism.

A preferred embodiment of my invention is illustrated as applied to a microscope having a hollow stand or arm 10 on which is mounted the slide 11 carrying the body tube 12. Coarse adjustment of the body tube is effected by means of the knurled disk 13 and a pinion, not shown, which cooperates with a rack, not shown, all as is well known to those skilled in the art.

The slide 11 is provided with a projection 14 which extends into the hollow stand or arm 10 and is supported by a pin 15 engaging a notch 16 in the projection 14 and a similar notch 17 in a bell crank lever 18. This lever 18 is pivoted at 19 to the wall of the stand 10. A spring 20 pushes down on the projection 14 to take up any lost motion and to make the movement of the slide 11 also positive when the microscope arm is used in a horizontal position. The rear wall 21 of an upper fluid chamber is rigidly fixed inside the arm 10 by means of a screw 22 and is formed with a perpendicular guide and bearing member 23. A cooperating guide and bearing member 24 is telescopically mounted upon the member 23 and carries a front wall 25 which is connected to the rear wall by means of a bellows 26 to form a tight liquid chamber. The wall 25 contacts directly with the second arm 27 of the bell crank lever 18 and due to the bearing and guiding members 23 and 24 it can only move in a substantially straight line to move the lever 18 and the slide 11. Thus when the volume of the upper chamber is changed there will be a responsive movement of the slide.

A conduit 28 leads from the upper chamber to a lower chamber which comprises two walls 29 connected by a bellows 30. In order to change the volume of the lower chamber, a threaded member 31 is fastened to each of the walls 29 and each passes through a removable guide 32 to a nut 33 having a knurled edge 34. Washers 35 separate each nut 33 from the adjacent guide 32 and a finishing plug 36 closes the end of each nut 33 so that no dust or dirt can get in to the screw threads. A screw 37 in the guide 32 extends into a longitudinal slot 38 in each of the members 31 to hold them against rotation. The ends of these slots 38 serve also, in conjunction with the screws 37, to limit the movement of the threaded members 31.

Each guide 32 is provided with an inwardly extending annular shoulder 39 which act as guides for the members 31. A compression spring 40 surrounds each member 31 and abuts the shoulder 39 and chamber wall 29 tending to compress the chamber.

In operation, one of the nuts 33 is turned moving its threaded member 31 thus changing the volume of the lower chamber. This change in volume is transmitted to the upper chamber through the tube 28 and the front wall 25 of the upper chamber is moved in response to the change. This movement is transmitted through the bell crank lever 18 to the projection 14 thus raising or lowering the slide 11. In order to get the proper reduction of motion, the lower chamber is usually smaller than the upper chamber and their relative sizes depend solely on the reduction ratio desired as is well known.

From the foregoing it will be obvious that I am able to attain the objects of my invention and provide an improved fine adjustment mechanism for microscopes which can be advantageously manufactured and assembled and will be simple in structure yet efficient in operation. Although I have shown only one embodiment of my invention, it is obvious that various modifications can be made without departing from the spirit of my invention as pointed out in the appended claims.

I claim:

1. A microscope comprising a stand, a body tube adjustably carried by said stand, a microscope optical system mounted in said body tube, a fluid container, means for applying pressure to fluid in the container, a second fluid container operatively connected to said tube for adjusting said tube and means interconnecting said containers and a fluid filling said containers and said connecting means.

2. A microscope comprising a stand, a body tube adjustably mounted thereon, a microscope optical system carried by said body tube, a fluid chamber, means for changing the volume of said chamber, a second fluid chamber having a portion movable in response to changes in volume, a conduit connecting said chambers, a fluid in said chambers and said conduit, and means actuated by movement of movable part of said second chamber for adjusting said body tube.

3. A microscope comprising a hollow frame, a body tube adjustably mounted on said frame, a microscope optical system carried by said body tube, two expansible interconnected fluid chambers mounted in said frame, a fluid in said chambers, tube adjusting means operatively connected to one of said chambers and means for varying the volume of the other chamber.

4. A microscope comprising a support, a body tube adjustably mounted on said support, a microscope optical system carried by said body tube, a bell crank lever for adjusting said body tube to focus said optical system, an expansible fluid tight chamber for actuating said lever and fluid means for expanding or contracting said chamber.

5. A microscope comprising a frame, a body tube adjustably mounted on said frame, a microscope optical system mounted in said body tube, a fluid chamber of variable length and of relatively small cross sectional area, means for varying the length of said chamber, a second fluid chamber of variable length and relatively large cross sectional area operatively connected to said first chamber and means operatively interconnecting said second chamber and said tube for adjusting said tube to focus the optical system.

6. A microscope comprising a support, a body tube slidably mounted on said support, a microscope optical system mounted in said body tube, a plate fixed to said support, a second plate, an expansible tube extending between said plates and forming fluid tight chamber therewith, cooperating guide means extending between said plates whereby said second plate is movable only linearly with respect to said first plate, means for changing the volume of the chamber formed by said expansible tube and said plates to move said second plate and means for transmitting the motion from said second plate to said body tube.

7. A microscope comprising a supporting arm, a body tube slidably mounted on one end of said arm, a microscope optical system mounted in said body tube, an expansible fluid chamber and operative connections carried by said arm adjacent said body tube for sliding said body tube to focus said optical system, a second expansible fluid chamber carried by said arm at a point removed from said body tube, a conduit connecting said chambers, a fluid in said chambers and said conduit and means for changing the volume of said second chamber.

8. A microscope comprising a supporting arm, a body tube slidably mounted on one end of said arm, a microscope optical system mounted in said body tube, an expansible fluid chamber and operative connections carried by said arm adjacent said body tube for sliding said body tube to focus said optical system, a second expansible fluid chamber carried by said arm at a point removed from said body tube, a conduit connecting said chambers, a fluid in said chambers and said conduit and means for changing the volume of said second chamber, said means comprising a resilient member for changing the volume of said chamber in one direction and a screw for changing the volume of said chamber in the other direction.

9. A microscope comprising a support, a body tube slidably mounted thereon, a microscope optical system mounted in said body tube, an expansible chamber secured at one end to said support and having a movable end operatively connected for sliding said body tube, means for guiding said movable end of said chamber, and hydrostatic means for changing the volume of said chamber to move said end.

10. A microscope comprising a support, a body tube slidably mounted thereon, a microscope optical system mounted in said body tube, an expansible chamber secured at one end to said support and having a movable end operatively connected for sliding said body tube, means for guiding said movable end of said chamber, and hydrostatic means for changing the volume of said chamber to move said end, said last-named means comprising a second expansible chamber and means for changing the volume of said second chamber.

11. A microscope comprising a support, a body tube slidably mounted on said support, a microscope optical system mounted in said body tube, a bearing stud fixed on said support, an actuating member slidably mounted on said stud, means interconnecting said member and said body tube whereby movement of said member moves said tube, an expansible chamber having one end fixedly secured to said support and the other end fixedly secured to said member, and hydrostatic means for changing the volume of said chamber.

12. A microscope comprising a support, a body tube slidably mounted on said support, a microscope optical system mounted in said body tube, a bearing stud fixed on said support, an actuating member slidably mounted on said stud, means interconnecting said member and said body tube whereby movement of said member moves said tube, an expansible chamber having one end fixedly secured to said support and the other end fixedly secured to said member, and hydrostatic means for changing the volume of said chamber, said hydrostatic means including a second expansible chamber and means for changing the volume of said second chamber.

13. A microscope comprising a support, a body tube slidably mounted on said support, a microscope optical system mounted in said body tube, and a lever pivotally carried by said support for sliding said body tube to focus said optical system, an expansible fluid-tight chamber engaging said lever and means for varying the volume of said chamber to actuate said lever, said means including a fluid pressure system.

14. A microscope comprising a support, a body tube slidably mounted on said support, a microscope optical system mounted in said body tube, and a lever pivotally carried by said support for sliding said body tube to focus said optical system, an expansible fluid-tight chamber engaging said lever and means for varying the volume of said chamber to actuate said lever, said means including a second expansible fluid-tight chamber, a tube connecting said chambers and means for positively changing the volume of said second chamber.

15. A microscope comprising a support, a body tube slidably mounted thereon, a microscope optical system mounted in said body tube, an expansible fluid chamber operatively connected for moving said tube to focus said optical system, a second expansible fluid chamber connected to said first chamber by a conduit, a fluid filling both chambers, a plate spring pressed against said second chamber, a slidable rod for retracting said plate against the action of said spring and threaded means for sliding said rod.

GEORGE B. GALLASCH.